(12) United States Patent
Chen

(10) Patent No.: US 7,814,815 B2
(45) Date of Patent: Oct. 19, 2010

(54) TOOL HEAD STRUCTURE

(76) Inventor: Bo-Shen Chen, No. 33-33, Lane 320, Sec. 1, Shatian Rd., Dadu Township, Taichung County 432 (TW)

( * ) Notice: Subject to any disclaimer, the term of this patent is extended or adjusted under 35 U.S.C. 154(b) by 227 days.

(21) Appl. No.: 12/265,645

(22) Filed: Nov. 5, 2008

(65) Prior Publication Data
US 2009/0056511 A1  Mar. 5, 2009

Related U.S. Application Data

(63) Continuation-in-part of application No. 11/770,723, filed on Jun. 28, 2007, now abandoned.

(51) Int. Cl.
*B25B 13/50* (2006.01)
*B25B 23/08* (2006.01)

(52) U.S. Cl. .............. 81/53.2; 81/441; 81/460; 7/165

(58) Field of Classification Search .......... 81/441, 81/53.2, 460; 408/225, 227, 229; 7/158, 7/165
See application file for complete search history.

(56) References Cited

U.S. PATENT DOCUMENTS

| | | | | |
|---|---|---|---|---|
| 3,592,555 A * | 7/1971 | Mackey, Sr. | ............... | 408/225 |
| 4,968,193 A * | 11/1990 | Chaconas et al. | ........... | 408/211 |
| 6,742,416 B2 * | 6/2004 | Bergamo | ................... | 81/53.2 |
| 6,868,572 B1 * | 3/2005 | Newton | ....................... | 7/165 |
| 7,000,501 B1 * | 2/2006 | Chen | ......................... | 81/53.2 |
| 2004/0007095 A1 * | 1/2004 | Meng | ......................... | 81/53.2 |
| 2006/0037440 A1 * | 2/2006 | Kozak | ........................ | 81/53.2 |
| 2006/0056930 A1 * | 3/2006 | Rompel | ...................... | 408/225 |
| 2006/0150780 A1 * | 7/2006 | Chen | ......................... | 81/53.2 |
| 2008/0105092 A1 * | 5/2008 | Chen | ......................... | 81/53.2 |

* cited by examiner

*Primary Examiner*—D. S Meislin
(74) *Attorney, Agent, or Firm*—Banger Shia

(57) ABSTRACT

A tool head structure is used to screw a regular screw or a damaged screw and comprises two cutting portions located at the center of the front portion thereof. Between the two cutting portions is formed a ridge line, and behind the two cutting portions are formed two concave flank portions, and the respective flank portions are correspondingly linked up with scraping grooves. By such arrangements, the tool head structure can solve the problems of easy slipping and being unable to remove the damaged screw.

3 Claims, 9 Drawing Sheets

TOOL HEAD STRUCTURE

This application is a continuation of part of U.S. patent application Ser. No. 11/770,723, now abandoned, which claims the benefit of the earlier filing date of Jun. 28, 2007.

BACKGROUND OF THE INVENTION

1. Field of the Invention

The present invention relates to a tool head structure which is used to screw a regular screw or a damaged screw and further can directly drill a hole in the working surface.

2. Description of the Prior Art

Conventionally, when using the tool heads (such as: slot screwdrivers, cross screwdrivers or star screwdrivers) to screw various screws, it often causes the following problems:

1. The screw was often screwed in an embedded manner to obtain a smooth and nice looking working surface, but the corresponding embedding working procedure of the screw head is troublesome, the operator must replace the tool head with drill bit to machine an embedding recess, and then replace the tool head again to screw the screws, thus greatly increasing the cost.

2. The head portion of the screw is often damaged by a damaged screwdriver head, and the damaged head of the screw will cause the screw unable to continue the screwing operation, so the operator must remove the damaged screw as soon as possible, thus reducing the whole work efficiency.

3. During a general screwing operation, the unbalanced force applied by the operator and the poor contact angle between the screwing tool and the screw often cause the screw head to be damaged, or a slippage during operation causes the unexpected injuries, thus not only causing the screw unable to continue the screwing operation, but also causing the severe problem of injury.

In order to solve a part of the abovementioned problems, as shown in FIG. 1, the tool head 10 disclosed by U.S. Pat. No. 6,868,572 B1 is mounted with a drill cone 11 at the center thereof, and the protruding driving portion of the tool head 10 is formed with a blade 101. Moreover, four claw portions 12 are extended from one end of the drill cone 11, and on the front edge of each claw portion 12 is formed a cutting portion 121. By such arrangements, this conventional structure can perform both the drilling operation and the screw driving operation. The damaged screw can be removed by engaging the claw portions 12 of the drill cone 11 in the screwing recess of the screw. However, the abovementioned structure still has the following problems:

1. The end portion of the drill cone 11 is extended to form four claw portions 12, so there is not a key ridge line of a general drill, but the four angle points or four equally divided cross bevel edge. Hence, this drill cone 11 has a poor grasping ability, thus often skidding on the surface of the machining object during an electric drive operation.

2. The engagement of the claw portions 12 of the drill cone 11 with the screwing recess of the damaged screw makes the claw portions 12 grasp the inner of the screwing recess of the screw, but the four claw portion 12 with cutting portions 121 doesn't have the chisel point which is the most important during the drilling operation, so the hole drilling ability of this drill cone 11 is relatively poor.

3. The end portion of the drill cone 11 is extended to form four claw portions 12, and a special machining method is required to form the four cutting portions 121 of different directions and angles, hence the working procedure is complicated and the machining difficult is relatively high.

In order to solve the abovementioned relevant problems, based on the accumulative research technology and experience in the field of the screwdriver and the screw tool, from the angle of improving the effect of making a hole and simplifying the working procedure, the applicant of the present invention has developed a tool head structure for screwing the damaged screw.

The present invention has arisen to mitigate and/or obviate the afore-described disadvantages.

SUMMARY OF THE INVENTION

The primary objective of the present invention is to provide a tool head structure which can easily engage with the screw and is unlikely to skid.

The secondary objective of the present invention is to provide a tool head structure which can directly drill a hole in a working surface.

In order to achieve the above objectives, the tool head structure of the present invention comprises two scraping grooves longitudinally located on a periphery of a front portion of the tool head structure, each of the two scraping grooves including a scraping surface in a counterclockwise direction and a bounding surface in a clockwise direction, the scraping surfaces each including a scraping edge; two spacing grooves longitudinally located on the periphery of the front portion of the tool head structure and staggered with the scraping grooves, the respective spacing grooves including a first groove surface in the counterclockwise direction and a second groove surface in the clockwise direction; two protruding driving portions defined by the scraping surfaces of the scraping grooves and the second groove surfaces of the neighboring spacing grooves in the clockwise direction; two spacing protrusions defined by the bounding surfaces of the scraping grooves and the first groove surfaces of the neighboring spacing grooves in the counterclockwise direction; two ridge surfaces each including a first ridge edge and a second ridge edge that connects to each other at a chisel point, the ridge surfaces being located on boundaries of the scraping surfaces and top ends of the neighboring second groove surfaces in the counterclockwise direction, the first ridge edges being connected with the scraping edges, the second ridge edges being located between the scraping surfaces and the neighboring second groove surfaces in the clockwise direction; two cutting portions each including a first cutting portion edge and a second cutting portion edge that are oppositely arranged and further including a cutting portion line between the first and second cutting portion edges, the respective cutting portions being located on top ends of the protruding driving portions, the first cutting portion edge of each of the cutting portions coinciding in position with the first ridge edge of one of the ridge surfaces, and the second cutting portion edge of the each of the cutting portions coinciding in position with the second ridge edge of the other of the ridge surfaces, the cutting portion lines of the two cutting portions coinciding in position with each other, and two end points of the respective cutting portion lines coinciding in position with the chisel points; and two flank portions each including a first flank portion edge and a second flank portion edge, the respective flank portions being located on top ends of the spacing protrusions and between the bounding surfaces and the neighboring first groove surfaces in the counterclockwise direction, the first flank portion edges being located closer to the respective chisel points than the respective second flank portion edges.

DETAILED DESCRIPTION OF THE PREFERRED EMBODIMENTS

Figure 1:
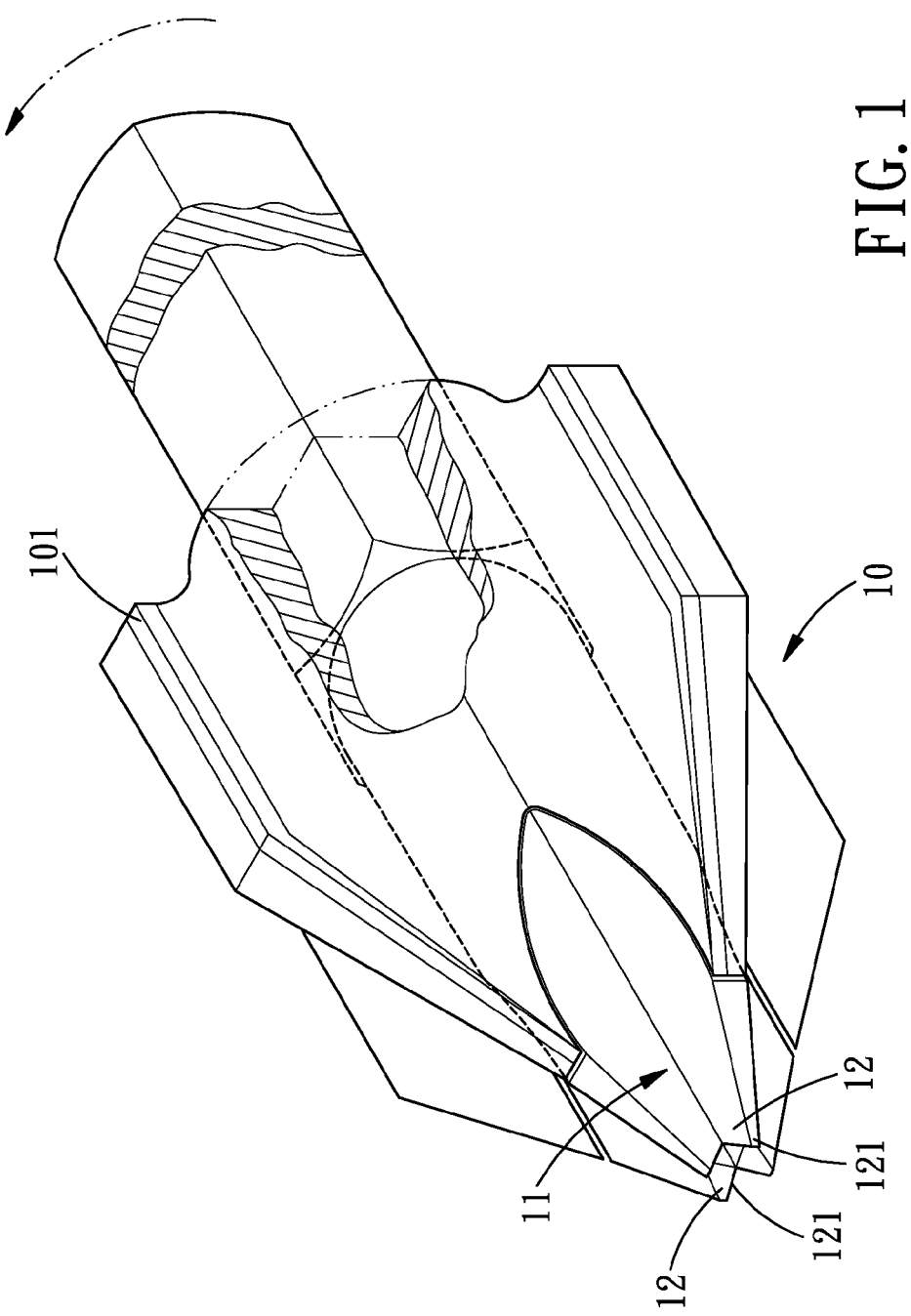
FIG. 1 is a perspective view of a conventional tool head structure.
Figure 2:
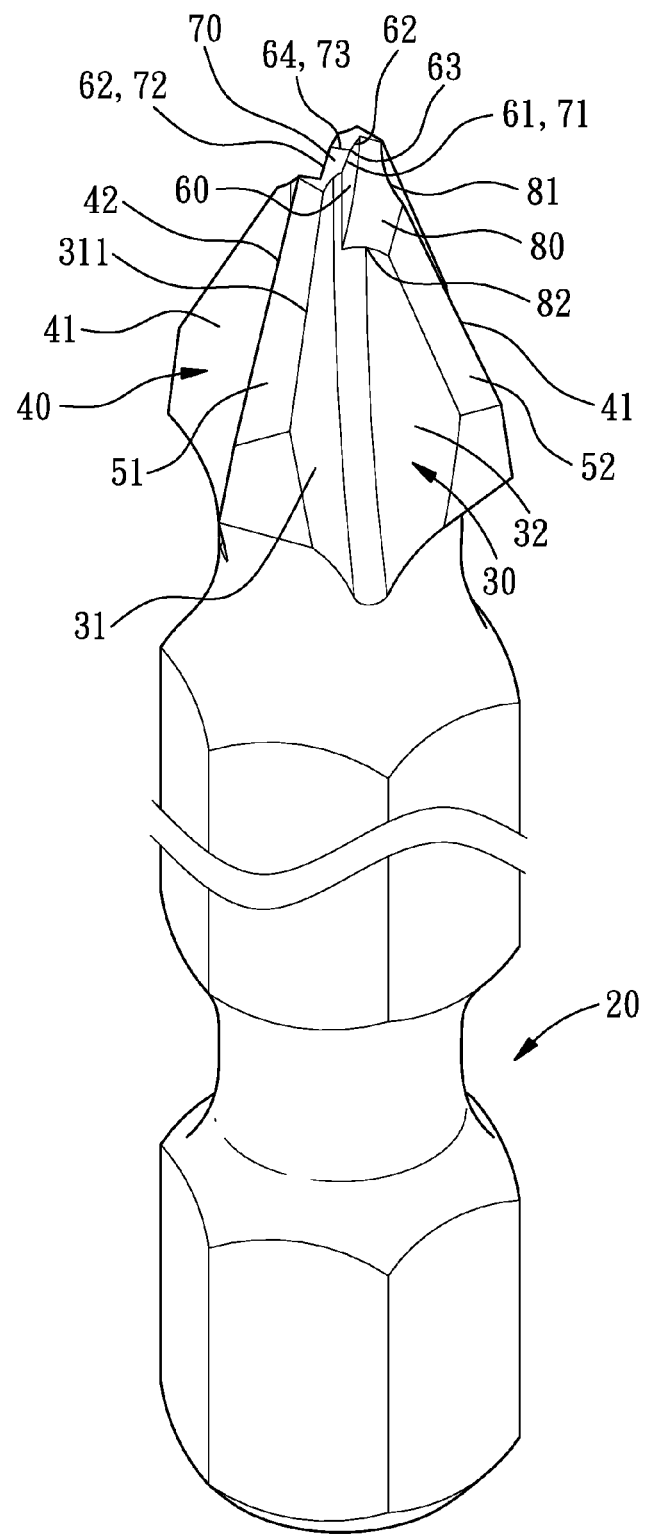
FIG. 2 is a perspective view of a tool head structure in accordance with the present invention.
Figure 3:
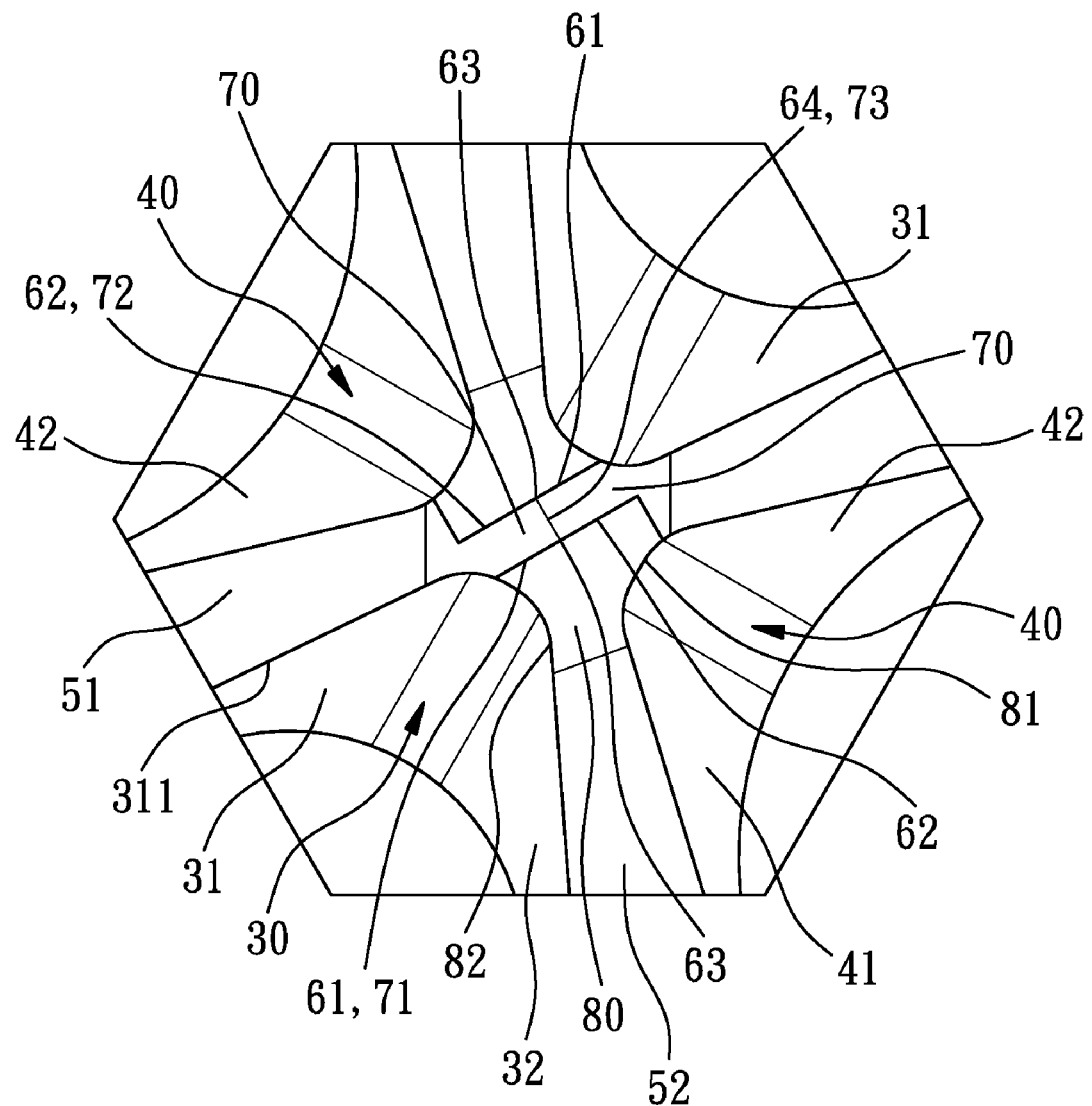
FIG. 3 shows one end of the tool head structure in accordance with the present invention.
Figure 4:
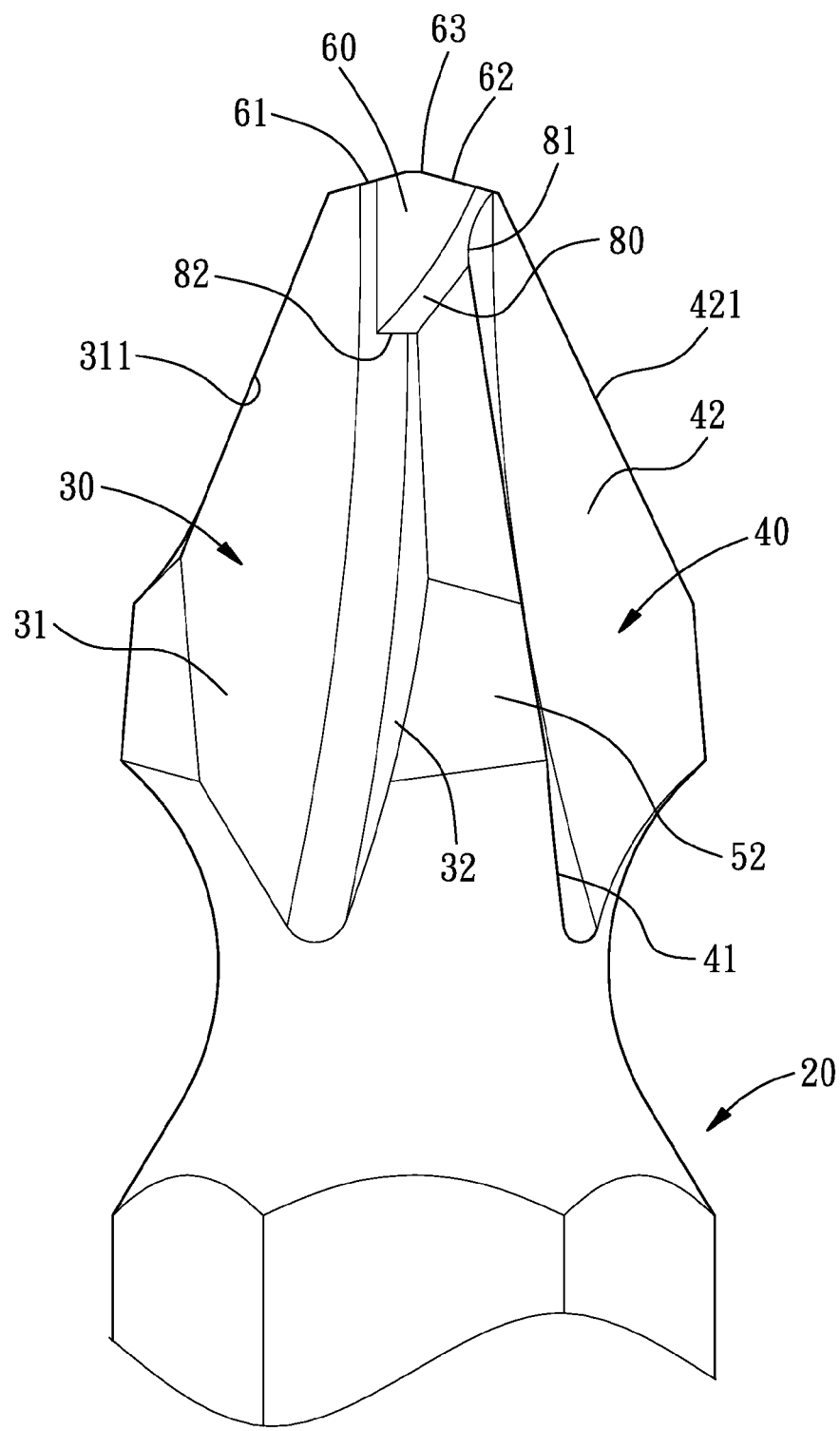
FIG. 4 is a side view of the tool head structure in accordance with the present invention.
Figure 5:
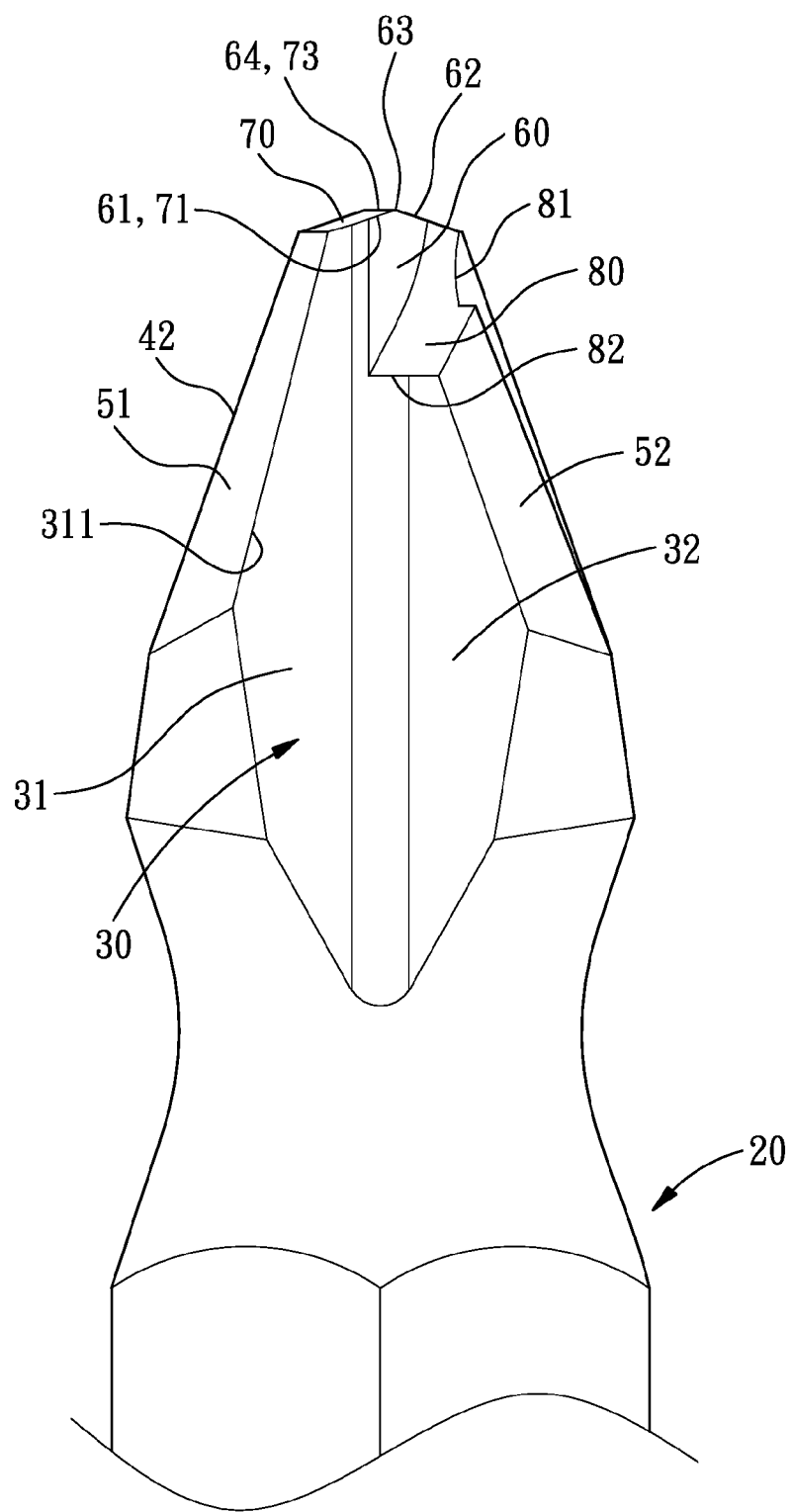
FIG. 5 is a side view of the tool head structure in accordance with the present invention of FIG. 4 that rotates 90 degrees counterclockwise.
Figure 6:
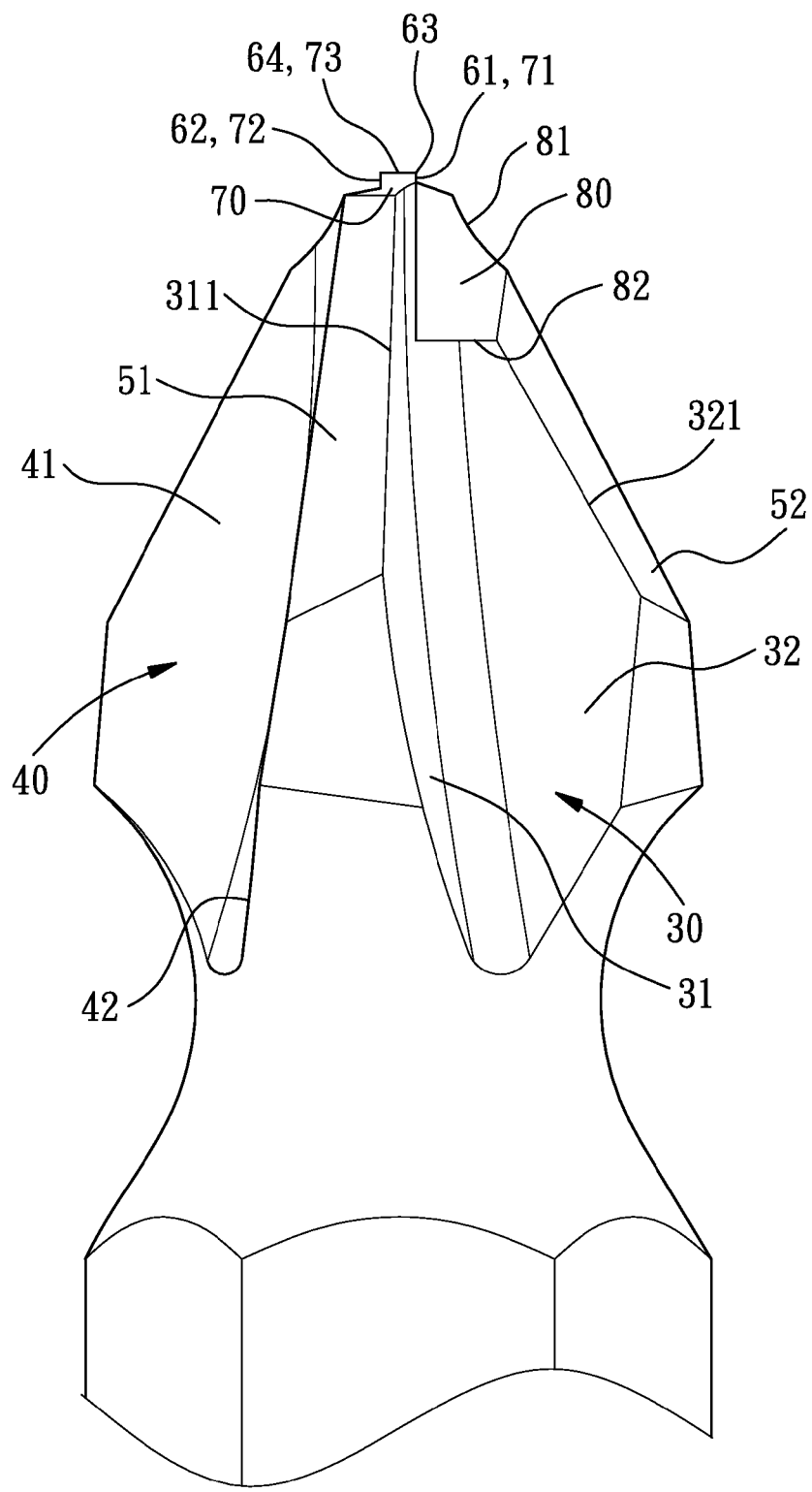
FIG. 6 is a side view of the tool head structure in accordance with the present invention of FIG. 5 that rotates 90 degrees counterclockwise.

The present invention will be clearer from the following description when viewed together with the accompanying drawings, which show, for purpose of illustrations only, the preferred embodiment in accordance with the present invention.

Referring to FIGS. 2-6, a tool head structure 20 in accordance with the present invention is integrally formed. The rear portion of the tool head structure 20 is in the form of a hexagonal column for assembling with relevant tools, and the front portion of the tool head structure 20 includes two scraping grooves 30, two spacing grooves 40, two protruding driving portions 51, two spacing protrusions 52, two ridge surfaces 60, two cutting portions 70 and two flank portions 80.

The two scraping grooves 30 are longitudinally located on the periphery of the front portion of the tool head structure 20 and each include a scraping surface 31 in the counterclockwise direction and a bounding surface 32 in the clockwise direction. Each of the scraping surfaces 31 includes a scraping edge 311.

The two spacing grooves 40 are longitudinally located on the periphery of the front portion of the tool head structure 20 and staggered with the respective scraping grooves 30. The respective spacing grooves 40 include a first groove surface 41 in the counterclockwise direction and a second groove surface 42 in the clockwise direction.

The two protruding driving portions 51 are defined by the scraping surfaces 31 of the scraping grooves 30 and the second groove surfaces 42 of the neighboring spacing grooves 40 in the clockwise direction, respectively.

The two spacing protrusions 52 are defined by the bounding surfaces 32 of the scraping grooves 30 and the first groove surfaces 41 of the neighboring spacing grooves 40 in the counterclockwise direction, respectively.

The two ridge surfaces 60 each include a first ridge edge 61 and a second ridge edge 62. The first and second ridge edges 61, 62 of each of the two ridge surfaces 60 connect to each other at a chisel point 63. The ridge surfaces 60 are located on the boundaries of the scraping surfaces 31 of the scraping grooves 30 and the top ends of the second groove surfaces 42 of the neighboring spacing grooves 40 in the counterclockwise direction, respectively. The respective chisel points 63 are located on the tip end of the front portion of the tool head structure 20. The two chisel points 63 define a ridge line 64 therebetween. The first ridge edges 61 connect with the scraping edges 311, and the second ridge edges 62 are located between the scraping surfaces 31 and the neighboring second groove surfaces 42 in the clockwise direction, respectively.

The two cutting portions 70 each include a first cutting portion edge 71 and a second cutting portion edge 72 that are oppositely located and further include a cutting portion line 73 between the first and second cutting portion edges 71, 72. The respective cutting portions 70 are located on the top ends of the protruding driving portions 51. The first cutting portion edge 71 of each of the cutting portions 70 coincides in position with the first ridge edge 61 of one of the ridge surfaces 60, and the second cutting portion edge 72 of the each of the cutting portions 70 coincides in position with the second ridge edge 62 of the other of the ridge surfaces 60. The cutting portion lines 73 of the two cutting portions 70 coincide in position with each other and further coincide in position with the ridge line 64 in such a manner that the two end points of the cutting portion line 64 coincide in position with the chisel points 63.

The flank portions 80 each include a first flank portion edge 81 and a second flank portion edge 82. The respective flank portions 80 are located on the top ends of the spacing protrusions 52 and between the bounding surfaces 32 and the neighboring first groove surfaces 41 in the counterclockwise direction. The first flank portion edges 81 are located closer to the respective chisel points 63 than the respective second flank portion edges 82.

The aforementioned is the summary of the positional and structural relationship of the respective components of the preferred embodiment in accordance with the present invention.

Figure 7:
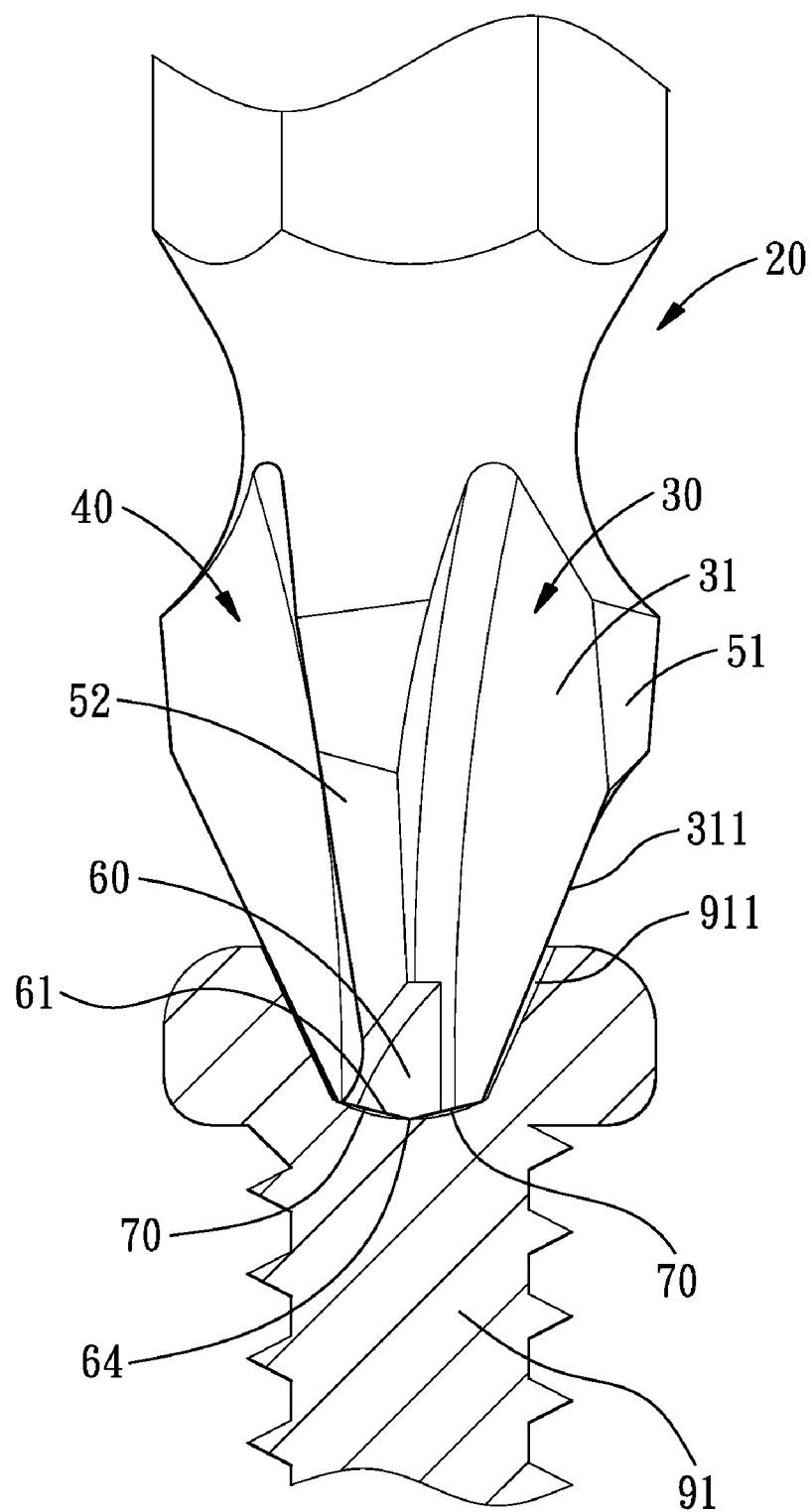
FIG. 7 is a cross-sectional view illustrating how the tool head structure in accordance with the present invention shovels into a damaged screw.
Figure 8:
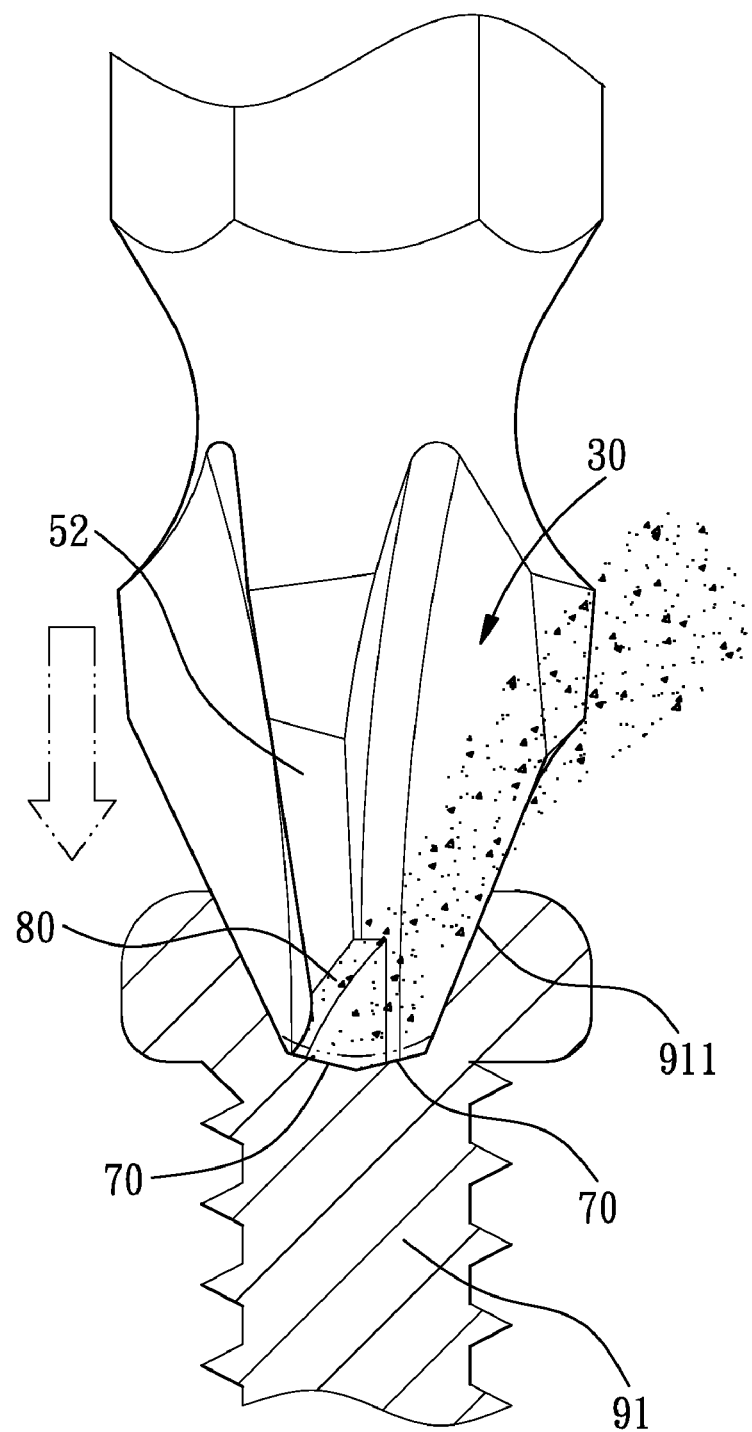
FIG. 8 is another cross-sectional view illustrating how the tool head structure in accordance with the present invention shovels into the damaged screw.

For a better understanding of the present invention, its operation and function, reference should be made to FIGS. 7-8. When the screw 91 with a damaged screwing recess 911 is screwed, the tool head structure 20 of the same size is employed in such a manner that the scraping grooves 30, the spacing grooves 40, the protruding driving portions 51 and the spacing protrusions 52 are engaged in the damaged screwing recess 911. Since the cutting direction of the scraping surfaces 31 of the scraping grooves 30 is the same as the screwing direction of the screw 91, when the tool head structure 20 rotates, the scraping surfaces 31 utilize the scraping edges 311 to engage the protruding driving portions 51 to the undamaged part of the screwing recess 911 adequately.

The key point is that, at the convergence center of the scraping grooves 30, the spacing grooves 40, the protruding driving portions 51 and the spacing protrusions 52 are formed two symmetrically-arranged cutting portions 70, and between the two cutting portions 70 is formed a ridge line 64, so that when the screw 91 with the damaged screwing recess 911 is screwed, the two cutting portions 70 of the present invention can utilize the ridge line 64 and the first ridge edges 61 to quickly bite the bottom surface of the screwing recess 911, thus effectively offering the functions of preventing slippage, increasing the engaging effect and screwing the damaged screw.

It is to be noted that, referring to FIG. 8, the present invention will produce cutting powder during the process of using. In order to solve the cutting powder problem, the present invention is formed with two flank portions 80 that are respectively located at the top ends of the spacing protrusions 52 and linked up with the scraping grooves 30. By such arrangements, when the two cutting portions 70 of the present invention shovel into the bottom of the screwing recess 911 of the screw 91, the powder caused by shoveling can be quickly discharged along the scraping grooves 30 from the flank portions 80. Hence, the powder caused by shoveling of the present invention can be smoothly discharged.

Figure 9:
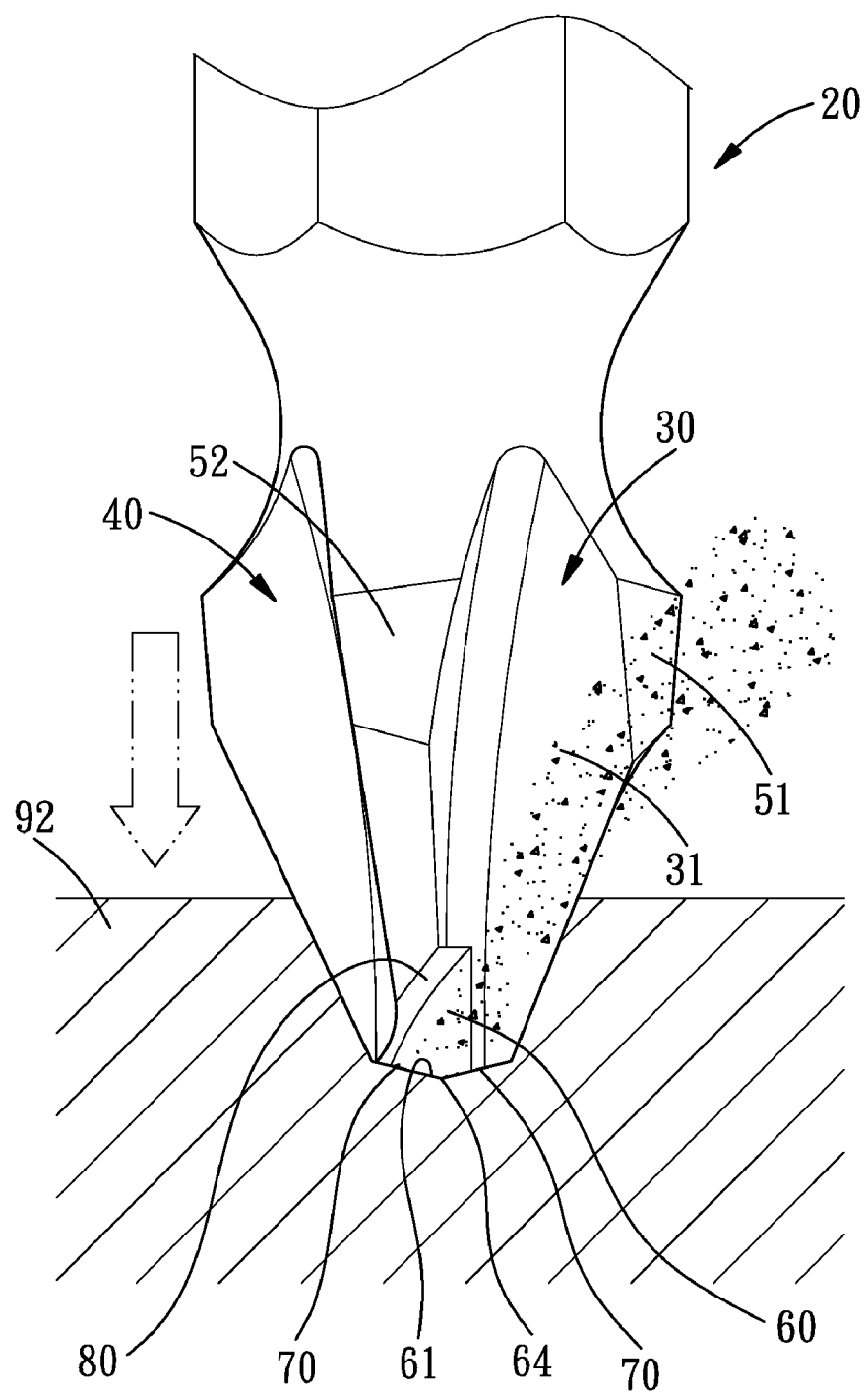
FIG. 9 is schematic view illustrating how the tool head structure in accordance with the present invention drills a hole.

Referring to FIG. 9, because at the convergence center of the scraping grooves 30, the spacing grooves 40, the protruding driving portions 51, the spacing protrusions 52 of the tool head structure 20 are formed two symmetrically-arranged cutting portions 70, between the two cutting portions 70 is formed a ridge line 64, and the two flank portions 80 are concave and formed behind the two cutting portions 70 for performing the powder discharging operation, the tool head structure of the present invention can drill into a regular machining surface 92 (such as: a board). By cooperating with the scraping surfaces 31 of the scraping grooves 30 and the first ridge edges 61 of the ridge surfaces 60 (i.e. the first cutting portion edges 71 of the cutting portions 70), since the cutting direction of the scraping surfaces 31 and the ridge surfaces 60 is the same as the screwing direction of the screw, with the abovementioned design, the tool head structure of the present invention can effectively perform the drilling operation, thus solving the problem of being unable to drill a hole.

While we have shown and described various embodiments in accordance with the present invention, it is clear to those skilled in the art that further embodiments may be made without departing from the scope of the present invention.

What is claimed is:

1. A tool head structure comprising:
   two scraping grooves longitudinally located on a periphery of a front portion of the tool head structure, each of the two scraping grooves including a scraping surface in a counterclockwise direction and a bounding surface in a clockwise direction, the scraping surfaces each including a scraping edge;
   two spacing grooves longitudinally located on the periphery of the front portion of the tool head structure and staggered with the scraping grooves, the respective spacing grooves including a first groove surface in the counterclockwise direction and a second groove surface in the clockwise direction;
   two protruding driving portions defined by the scraping surfaces of the scraping grooves and the second groove surfaces of the neighboring spacing grooves in the clockwise direction;
   two spacing protrusions defined by the bounding surfaces of the scraping grooves and the first groove surfaces of the neighboring spacing grooves in the counterclockwise direction;
   two ridge surfaces each including a first ridge edge and a second ridge edge that connects to each other at a chisel point, the ridge surfaces being located on boundaries of the scraping surfaces and top ends of the neighboring second groove surfaces in the counterclockwise direction, the first ridge edges being connected with the scraping edges, the second ridge edges being located between the scraping surfaces and the neighboring second groove surfaces in the clockwise direction;
   two cutting portions each including a first cutting portion edge and a second cutting portion edge that are oppositely arranged and further including a cutting portion line between the first and second cutting portion edges, the respective cutting portions being located on top ends of the protruding driving portions, the first cutting portion edge of each of the cutting portions coinciding in position with the first ridge edge of one of the ridge surfaces, and the second cutting portion edge of the each of the cutting portions coinciding in position with the second ridge edge of the other of the ridge surfaces, the cutting portion lines of the two cutting portions coinciding in position with each other, and two end points of the respective cutting portion lines coinciding in position with the chisel points; and
   two flank portions each including a first flank portion edge and a second flank portion edge, the respective flank portions being located on top ends of the spacing protrusions and between the bounding surfaces and the neighboring first groove surfaces in the counterclockwise direction, the first flank portion edges being located closer to the respective chisel points than the respective second flank portion edges.

2. The tool head structure as claimed in claim 1, wherein the chisel points of the ridge surfaces are located on a tip end of the front portion of the tool head structure.

3. The tool head structure as claimed in claim 2, wherein the tool head structure is integrally formed, and a rear portion of the tool head structure, which is opposite the end formed with the chisel points, is in the form of a hexagonal column for assembling with relevant tools.

* * * * *